(12) United States Patent
Oberle

(10) Patent No.: US 7,681,471 B2
(45) Date of Patent: Mar. 23, 2010

(54) MOTOR VEHICLE GEAR ARRANGEMENT FOR A POWER ASSIST GEARING IN A MOTOR VEHICLE

(75) Inventor: Stephan Oberle, Villingen-Schwenningen (DE)

(73) Assignee: IMS Gear GmbH, Donaueschingen (DE)

( * ) Notice: Subject to any disclaimer, the term of this patent is extended or adjusted under 35 U.S.C. 154(b) by 1165 days.

(21) Appl. No.: 11/038,015

(22) Filed: Jan. 18, 2005

(65) Prior Publication Data
US 2005/0223831 A1 Oct. 13, 2005

(30) Foreign Application Priority Data
Jan. 19, 2004 (DE) ........................ 10 2004 002 847

(51) Int. Cl.
*F16H 57/00* (2006.01)
(52) U.S. Cl. ................................ 74/411; 74/388 PS
(58) Field of Classification Search ............. 74/388 PS, 74/411, 425, 406, 409
See application file for complete search history.

(56) References Cited

U.S. PATENT DOCUMENTS

| 3,195,324 | A | * | 7/1965 | Sellwood et al. ............... 464/74 |
| 4,838,123 | A | * | 6/1989 | Matoba ....................... 475/335 |
| 4,899,608 | A | * | 2/1990 | Knappe et al. ................ 74/411 |
| 5,178,026 | A | * | 1/1993 | Matsumoto .................. 74/411 |
| 5,259,803 | A | * | 11/1993 | Lyman ........................ 446/103 |
| 5,657,666 | A |   | 8/1997 | Tsuda et al. .................... 55/14 |
| 5,927,149 | A | * | 7/1999 | Moody ......................... 74/443 |
| 5,956,998 | A | * | 9/1999 | Fenelon ...................... 74/89.17 |
| 6,058,794 | A |   | 5/2000 | Hempel |
| 6,070,484 | A | * | 6/2000 | Sakamaki ..................... 74/434 |
| 6,393,929 | B1 | * | 5/2002 | Quere et al. .................. 74/411 |
| 6,463,829 | B2 | * | 10/2002 | Torii et al. ................ 74/606 R |
| 6,647,818 | B1 | * | 11/2003 | Takeuchi et al. ............. 74/411 |
| 6,658,954 | B1 |   | 12/2003 | Bosa et al. ...................... 55/18 |
| 6,993,993 | B2 |   | 2/2006 | Konishi et al. |
| 7,159,485 | B2 | * | 1/2007 | Acosta ......................... 74/425 |
| 7,334,495 | B2 | * | 2/2008 | Takayama ..................... 74/431 |
| 2002/0029648 | A1 | * | 3/2002 | Noguchi et al. .............. 74/461 |
| 2004/0060379 | A1 |   | 4/2004 | Bernhard et al. ................ 55/14 |

OTHER PUBLICATIONS

WO/0238432 A1, Bernhard et. al., published on May 16, 2002.*
Erhard et al. "Maschinenelemente aus thermoplastischen Kunststoffen", Grundlagen und Verbindungselemente (1974) pp. VII-21.
* cited by examiner

*Primary Examiner*—Richard WL Ridley
*Assistant Examiner*—Matthew A Johnson
(74) *Attorney, Agent, or Firm*—O'Shea Getz P.C.

(57) ABSTRACT

A motor-vehicle gear arrangement for a power-assist gearing in a motor vehicle, that includes a gear, a flange arrangement including at least one flange, wherein the gear is located adjacent to the flange in the flange arrangement so as to rotate about a common axis, and at least one connecting element to connect the gear to the at least one flange. This gear arrangement, or a flange for this gear arrangement, is advantageous due to the fact that the ribs are formed on the flange laterally within a plane perpendicularly to the rotational axis so as to reinforce the flange.

10 Claims, 2 Drawing Sheets

MOTOR VEHICLE GEAR ARRANGEMENT FOR A POWER ASSIST GEARING IN A MOTOR VEHICLE

PRIORITY INFORMATION

This application claims priority from German patent application 10 2004 002 847.8 filed Jan. 19, 2004.

BACKGROUND OF THE INVENTION

The invention relates to a motor-vehicle gear arrangement for a power-assist gearing in a motor vehicle.

U.S. Patent Application Publication No. 2004/0060379A1 discloses a steering device for motor vehicles with a gearing system. The gearing system has a gear arrangement with a gear which is employed in the form of a worm gear between a first and a second flange. Driver elements in the form of connecting elements project in a spaced configuration from the central rotational axis that extends between the first flange and the second flange. The driver elements pass through corresponding take-up openings formed in the gear. In the gearing system, a worm of a steering linkage engages teeth of a gear ring on the outer circumference of the gear.

Individual components made of metal are generally preferred when constructing a gear arrangement of this type in order to provide sufficient stability. Gears made of plastic are also generally known—however, these exhibit limited stability.

What is needed is an improved motor vehicle gear arrangement for a power assist gearing in a motor vehicle.

SUMMARY OF THE INVENTION

A goal of the invention is to simplify a motor-vehicle gear arrangement for a power-assist gearing in a motor vehicle in regard to fabrication and the material employed, while at the same time ensuring high stability and strength.

A motor-vehicle gear arrangement for a power-assist gearing in a motor vehicle may include a gear, a flange arrangement, and at least one connecting element to connect the gear to the at least one flange. Ribs are formed laterally in one plane of the flange.

A motor-vehicle gear arrangement for a power-assist gearing in a motor vehicle is advantageous, for example, for use in an electrical steering device to couple a steering assist apparatus when the gear arrangement has a gear, a flange arrangement with at least one flange. The gear is located within the flange arrangement adjacent to the flange so they rotate about a common rotational axis. At least one connecting element connects the gear to the at least one flange. In some embodiments, ribs are formed on the flange laterally within a plane that extends perpendicular to the rotational axis of the flange, to reinforce the flange.

An arrangement of this type having ribs on the face of the flange increases the stability of the flange relative to a flat flange with the same flange thickness. The stability provided by the ribs permits the use of a flange thinner than would be possible otherwise, thereby saving material. An additional advantage is provided when the flange has lateral ribs as reinforcement elements, and the flange together with the ribs is fabricated out of plastic.

A flange of this type is thus composed of a material with relatively less strength when compared to metal. In order to increase the strength of the actual flange body, this body has laterally arranged ribs acting as reinforcement elements. This arrangement in particular allows for the use of a plastice, rather than metal, flange. In addition to permitting simpler machining, the use of plastic also offers a weight advantage relative to a flange made of metal.

In addition, a method of fabricating a motor-vehicle gear arrangement of the type having a flange like that described above is provided. The flange is designed with ribs located on one side of the flange which act as reinforcement elements for the flange. In particular, the flange can be produced with plastic ribs by injection molding.

In addition, a gear arrangement is provided that has at least one pin-shaped connecting element to connect the flange arrangement, or the at least one flange within the arrangement, to the gear. The flange has a circumferential rib around the connecting element in one insertion region for this connecting element. For example, at least some of the ribs are designed specifically as ring-shaped ribs in one region in which the body of the flange has a passage for the insertion of a connecting element. A pin-shaped connecting element thus has a lateral support (i.e., a support perpendicular to its longitudinal axis) not only in the insertion region through the body of the flange but also in the adjacent widened insertion region which is formed by the circumferential rib. The circumferential rib forms a reinforcement node for the flange, whereby the pins, or metal pins or other connecting elements, are inserted into the gear arrangement through the reinforcement node. In some embodiments, the pin is coated by injection molding to ensure a strong bond between the plastic and the pin.

In addition, a gear arrangement is provided in which the connecting element has a hole which passes from one front surface axially into the connecting element. In some embodiments, the hole extends through the connecting element. This arrangement has several advantages. In the event the pin is inserted into an injection molding die and then coated by injection molding, only a short segment of the pin is immersed in the die, if the complete length is coated with plastic by injection molding. The long end of the pin with the head that is free-standing within the die is supported or centered so that the pin is not deformed or damaged by the injection forces as it is coated by injection molding. In addition, the pin is supported so that the position of the free end with the head is sufficiently precise.

A gear arrangement is provided in which one or more connecting elements connect the flange to an additional flange and pass through connecting openings located in the gear between the flanges. The gear is thus supported between the flanges and is carried along by the connecting elements when the gear arrangement rotates.

A gear arrangement is also provided in which the additional flange is fabricated out of metal. The additional flange essentially functions as an end plate, thereby providing high strength in the axial direction, even with a reduced dimensioning. Alternatively, it is also possible to fabricate the additional flange out of plastic. In particular, the additional flange can be formed with the same type of ribs as the first flange.

A gear arrangement is also provided in which the additional flange is formed from a flat disk having on one side concavities or depressions, for example, ones deeper than a disk thickness or the thickness of the flange, which concavities or depressions form corresponding protrusions acting as drivers on the other side facing the gear. The protrusions that are created fulfill a driver function for the gear. The gear advantageously has corresponding slots within its lateral surface which the thus formed drivers engage.

A lateral surface of the flanges and gear is understood to mean a surface that extends essentially perpendicularly to the rotational axis of the flanges or gear.

A gear arrangement is also provided in which a finished hub of metal, (e.g., steel), is inserted into an axial opening of the flange fabricated out of plastic so as to introduce a shaft or spindle in a rotationally fixed manner. The steel hub provides sufficient strength and support for a shaft or spindle, while additionally providing the advantage of not requiring any subsequent finishing as long as the initial work was done sufficiently well.

A gear arrangement or flange of this type is advantageous when the ribs are formed as a single piece with the flange. As a result of the single-piece design, the ribs are connected in an especially rigid manner to the flange and provide especially high stability. In addition, single-piece fabrication is especially simple when using, for example, a powder-metallurgical molding process or plastic injection-molding process.

Advantageously, the ribs maybe arranged relative to each other in a framework for stability. Advantageously, the ribs, or some of the ribs, are circumferentially adjacent to one edge of the flange. These ribs are thus located in the outer lateral circumferential region or in the inner lateral circumferential region which is adjacent to the hub. Circumferential ribs formed on a circumferential path may also, however, be formed between the edge regions of the flange to increase stability. In particular, a circumferential rib may be ring-shaped and run from one reinforcement node to the next to increase the reinforcement of the entire system with respect to the connecting elements when the connecting elements pass through the reinforcement nodes.

An embodiment is also provided in which the connecting element passes through a neck of the flange, where the flange neck passes in the direction of the gear into or through an opening in the gear. While the ribs are preferably formed on a side of the flange facing away from the gear, the flange neck is preferably in the form of a connecting piece in the direction of the gear. Ultimately, the flange neck can also be formed by a rib of this type. In the event the ribs are located on the side of the flange which faces the gear or the side of the gear, the flange neck can also be formed by a raised rib which passes into the opening in the gear, thereby performing an active function between the flange and the gear as a driver or stabilization element.

In one embodiment, at least one sprue segment for the injection molding of the flange is located on that side of the flange on which the ribs are located.

In another embodiment, at least one sprue segment for the injection molding of the flange is adjacent to an opening, where the opening is formed for the insertion of a connecting element. This has the advantage that any weak points during the injection molding process which normally occur at some distance from the sprue segment are created at a considerable distance from those regions in which the connecting elements are located.

Whereas in a preferred embodiment, the material used for the flange is plastic, the various advantages of the basic principle are also achieved when employing another material, in particular a metal such as light aluminum.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
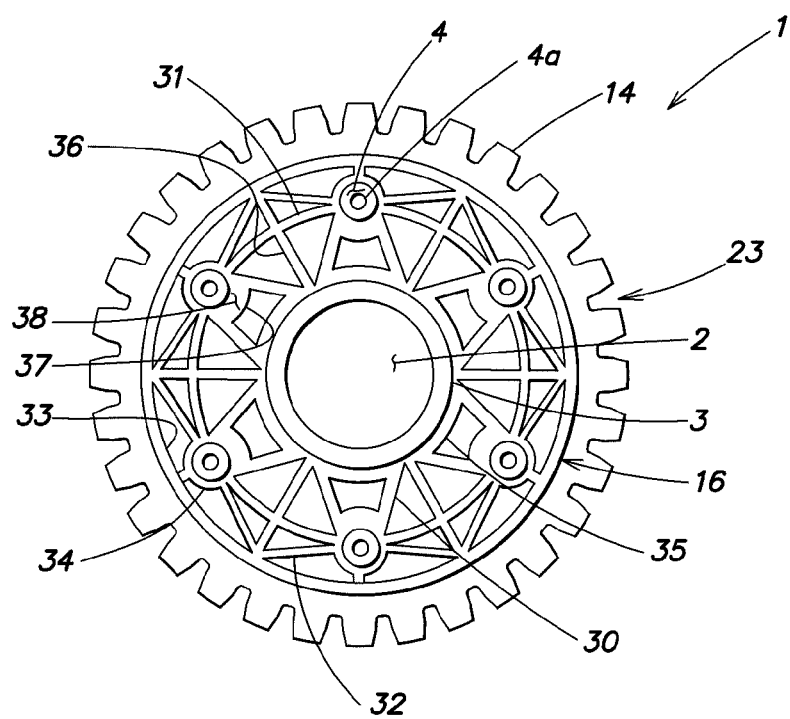
FIG. 1 is a side view of a flange of a motor-vehicle gear arrangement for a power-assist gearing in a motor vehicle, the laterally oriented flange having ribs or struts acting as reinforcement elements.

FIG. 1 is a side view of an example of a preferred gear arrangement, wherein a side wall of a first flange of a flange arrangement is shown which extends in a plane perpendicular to the rotational axis of the gear arrangement 1. In the region of the central rotational axis, an axial opening 2 passes through the entire gear arrangement I to accommodate a shaft or spindle which is connected by a hub 3 to the gear arrangement I in a rotationally fixed manner. In a preferred embodiment, the hub 3 is inserted in a rotationally fixed manner within an axial opening of a flange 16 which transmits the rotation to a gear 14, preferably one fabricated out of plastic, of the gear arrangement 1. When using a flange 16 composed of a plastic material, the hub 3 may be formed from a metal material (e.g., case-hardened steel) with the result that there is no need for subsequent finishing. In the conventional manner, the gear 14 has a circumferential gear ring 23 extending radially over its outer circumference.

Figure 2:
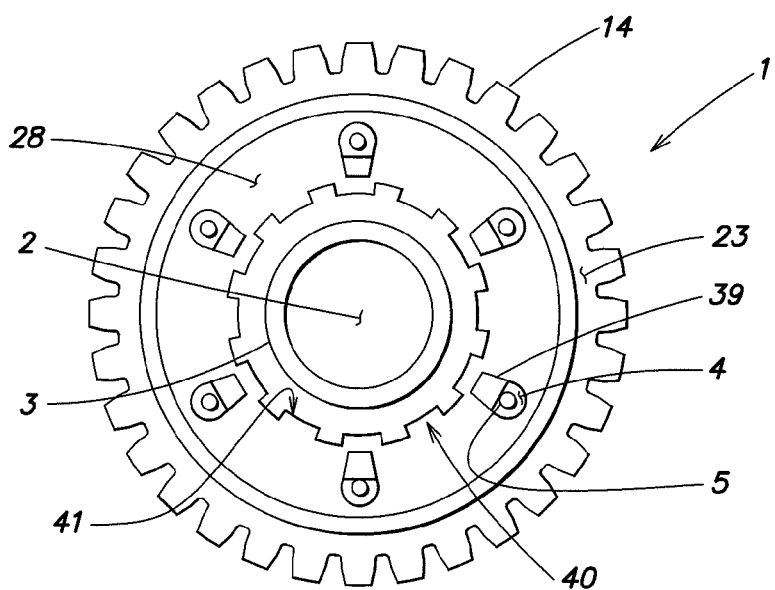
FIG. 2 illustrates a lateral arrangement of the gear arrangement of FIG. 1, as seen from the opposite side.

The gear 14 is located in the gear arrangement 1 between the first flange 16 and a second flange 28 shown in FIG. 2. Connection of the two flanges 16, 28 is preferably effected by pin-shaped connecting elements or pins 4, or metal pins which pass through passages 5 or holes in the flanges 16, 28 and through passages or slots 22, illustrated in FIG. 3, within the intermediate gear 14. Connecting elements 4 can interconnect the two flanges 16, 28 here by rivet or screw connections, or other suitable connectors. In some embodiments (e.g., a motor vehicle steering-effort assist device), a simple plug-in connection between the pins and the flanges may be used. In this plug-in connection, the outer circumference of the connecting elements 4 is matched to the inner circumference of the passages 5 in such a way that a frictional connection is created that provides sufficient support. The connection between the connecting elements 4 and the second flange 28 can be radially riveted, while the opposite end of the connecting elements 4 are each provided with a wider outer circumference end section and are recessed so as to be flush within the material of the first flange at its outer surface. For purposes of insertion and possibly further stabilization, a hole 4a passes into the widened region of the outside face of the connecting elements 4.

The first flange 16 is fabricated out of a light material; e.g., plastic. In order to increase the stability or to reinforce the first flange 16, the flange has struts or ribs 30-36 on its lateral surface. The ribs 30-36 are arranged in a manner analogous to a framework, such as one known from a housing construction application not according to the species. In some embodiments, the ribs 30-36 are formed as a single piece with the actual main body of the flange 16 to form a stable connection between the main body and the ribs. A further advantage of the single-piece design for the main body and the ribs is that the main body and ribs can be formed in a single operation through pressing or injection molding.

In the lateral region adjacent to the inside edge or circumference of the flange 16, a ring-shaped rib 35 is formed as an inner ring to provide reinforcement of the inner side. The inside ring-shaped rib 35 projects further away from the surface of the main body of the flange 16 than the remaining ribs 30-34, 36, and surrounds the hub 3. The outer circumference of the hub 3 is thus connected to the ring-shaped inside rib 35 over a large circumferential surface such that the area for power transmission during a rotation is advantageously large.

Figure 3:
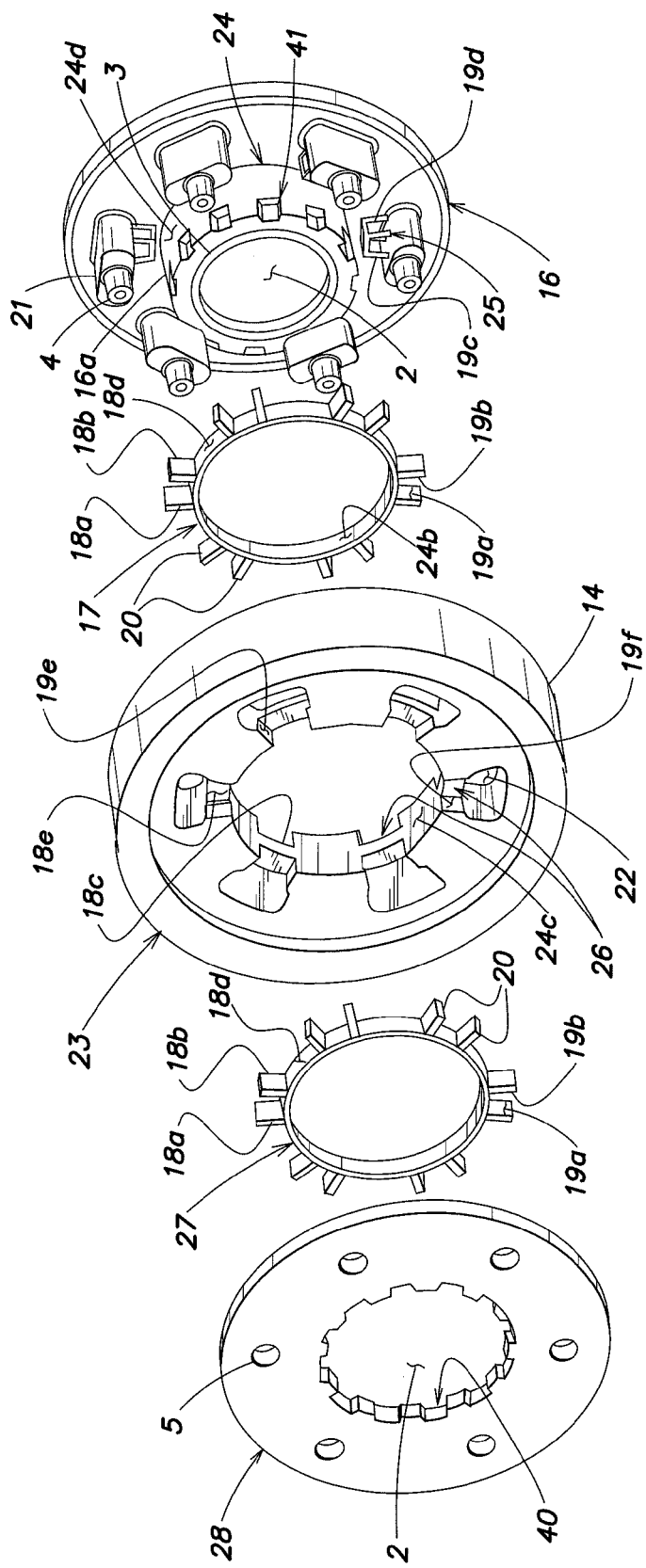
FIG. 3 is illustrates an example of such a gear arrangement in an exploded view.

The ring-shaped rib 35, located or separately formed on the inside, also advantageously extends from the opposite lateral surface of the flange 16 in the form of a connecting piece 24, illustrated in FIG. 3. The inner circumference of the connecting piece 24 in turn surrounds the outer circumference of the hub 3, and at its outer circumference engages and passes through a central passage of the gear 14. The gear 14 thus receives inside support by the outer circumference of the connecting piece 24 to the extent these components are not separated by a ring-shaped gap in another embodiment.

An outside rib 33 is also provided in the lateral adjacent region of the outer circumference of the flange 16. The outside ring-shaped rib 33 of this type widens out the outer circumferential surface of the flange 16 axially, thereby increasing the stability of the outer circumferential region.

The ring-shaped ribs 34 are particularly advantageous which are formed on the lateral surface of the flange 16 around the passages in order to accommodate connecting the elements 4. These circumferential ring-shaped ribs 34 form reinforcement nodes and provide increased support for the connecting elements 4. In addition to increased stability and strength for the flange 16 in the region of the connecting elements 4, the entire gear arrangement 1 is also stabilized by the stronger support of the connecting elements 4.

Additional ribs may run along the lateral surface of the flange 16, in particular, for example, an additional ring-shaped or circular rib 31. Reinforcement is also enhanced by obliquely running ribs 32, 30. Advantageously, all of these various ribs (i.e., the obliquely running ribs 32, 30 and the circular rib 31) run in each case through at least one reinforcement node or to one of the circumferential ribs 34, each of which encircle a connecting element 4. Radially running ribs 36 are also advantageous, these being especially preferred when each is located in the region between two respective ribs 34 which are designed as reinforcement nodes.

An injection molding process can be used to fabricate the flange out of plastic. Sprue segments 37 for injecting liquefied plastic can be formed adjacent to the ring-shaped ribs 34 or reinforcement nodes through which the passages for the insertion of the connecting elements 4 are formed. The sprue 38 is thus produced in a region of the flange 16 in which especially high stability is required. In addition, this arrangement of the sprue segments 37 allows for distribution of the injected plastic material into the regions with the ribs 30-36. The sprue 38 is placed on the side of the flange 16 on which the ribs 30-36 protrude away from the lateral surface of the flange 16. However, it is also possible to locate the sprue segments 37 on the opposite side of the flange.

Although it is disclosed above that the ribs 30-36 are located on the side of the flange 16 which faces away from the gear 14, the ribs can alternatively be formed on the side of the flange 16 which faces the gear 14 exclusively, or in addition to ribs on the side facing away from the gear 14.

Referring to FIG. 3, structural elements 21, 24 are formed on the side of the flange 16 facing the gear 14. The structural elements 21, 24 may be formed as a single piece with the flange 16. The structural elements 21, 24 connect the gear 14 to the second flange 28.

Referring to FIG. 2, the second flange 28 is also designed to be functionally structured. Depressions 39 in the outside surface lead to protrusions on the inside lateral surface of the second flange 28 facing the gear 14. These protrusions engage, for example, correspondingly formed depressions having contact surfaces 19e, 19f in the opposite lateral surface of the gear 14, thereby functioning as drivers and/or guide elements. Advantageously depressions and protrusions in the second flange 28 are located in segments which are adjacent to the connecting elements 4 leading through the passages 5. Forces acting on protrusions are thus directly transmittable through the pins 4 to the first flange 16, or in the opposite direction.

While the second flange 28 can be made of metal, it is also possible to make the second flange out of plastic. In addition, ribs for reinforcement can also be formed on the lateral walls of the second flange 28. In the embodiment shown, the inner circumference of the second flange, as well as the outer circumferential segment of the first flange passing through the second, have an interlocking structure with concavities and protrusions, or a toothing which also has the function of force transmission.

FIG. 3 is an exploded view of an elastic compensation coupling of which the gear 14 of FIGS. 1 and 2 forming a worm gear is a part. A motor-vehicle gear arrangement for a power-assist gearing of a motor vehicle is thus formed, wherein the power-assist gearing of a motor vehicle functions, for example to couple an electromotive auxiliary force for power steering to a steering linkage system.

The gear 14 has a gear ring 23, the teeth not being shown, which a worm engages. The other coupling component of the elastic compensation coupling, the first flange 16, is connected in a rotationally fixed manner to an input shaft, not shown, specifically through a connecting piece, along with a front surface 16a and a peripheral surface 24d, and the hub 3.

In addition to the two components of the compensation coupling, the gear 14 and the flange 16, there is a ring-shaped elastic spacer 17 with extensions 20. In the assembled state, an inner surface 24b of the spacer 17 rests on the peripheral surface 24d of the connecting piece of the flange 16. Two of the extensions 20 each surround a respective one of a plurality of studs or pins 25 on the flange 16.

The gear 14 exhibits mirror symmetry in other words, it has the same appearance on the nonvisible rear side as it does on the front side. After assembly, the gear 14 is supported by the spacer 17, which in turn is supported by the connecting piece of the flange 16. An inner surface 24c of the gear 14 thus rests on an outer ring surface 18d of the spacer 17. Concavities 26 of slots 22 are provided in the gear 14. The extensions 20 fit within the concavities 26.

Although it is possible that the gear 14, flange 16, and spacer 17 would be sufficient to fulfill the function of an elastic compensation coupling, the front side of the gear 14 is augmented by a second spacer 27 and the second flange 28 forming another compensation coupling. In the assembled state, the flanges 16 and 28 are interconnected by driver elements or lugs 21, and the pin-shaped connecting elements 4. In addition, an inner toothing 40 of the second flange 28 engages a toothing 41 of the connecting piece on the first flange 16. In the assembled state, the second elastic spacer 27 is also seated on the connecting piece of flange 16. The rear side of the second flange 28 has these same studs 25 as the first flange 16. These studs of the second flange 28 each project into the intermediate space between two closely adjacent extensions 20 of the spacer 27. The studs are preferably formed as protrusions which are formed opposite the depressions 39.

In this case, for example, a front-side contact surface 18a of the second spacer 27 contacts the rear side of the second flange 28. A rear-side contact surface 18b of the second spacer 27 contacts a contact surface 18e of the concavity 26 in the gear 14. Lateral contact surfaces 19a, 19b of the spacers 17 or 27 contact the lateral contact surfaces 19c, 19d of the stud 25, or contact the lateral contact surfaces 19e, 19f of the concavities 26 in the gear 14.

The extensions 20 thus prevent the studs 25 from directly touching the lateral surfaces 19e, 19f of the concavities 26 when torque is transmitted in one or the other direction. The spacers 17, 27 are designed to be sufficiently wide that they prevent direct contact axially between the gear 14 and the flange 16, or between the gear 14 and the second flange 28. Since the ring-shaped parts of the spacers 17, 27 are located between the peripheral surface 24d of the flange 16 and the inner surface 24c of the gear 14, the design also ensures that in a radial direction direct contact between the connecting piece of the flange 16 and the gear 14 is avoided. In other words, the spacers 17, 27 thus form a buffer, both axially and radially, and ultimately even tangentially, between the flange 16, and thus the input shaft on the one hand, and the gear 14 on the other.

In the tangential direction, however, the elastic buffering is not unlimited, since the slots 22 in the gear 14 through which the lugs 21 of the flange 16 engage are tangentially only slightly larger than lugs 21. The result is that the lugs 21 and the slots 22 form mutual stops which come into effect if the extensions 20 of the spacers 17, 27 are squeezed together by a certain amount whenever an excessively large torque is transmitted.

FIGS. 1 and 2 show the gear arrangement 1 which may be employed as the gear 14, as shown in FIG. 3, for example, in a power-assist gearing in a motor vehicle. It is of course also possible to employ the gear 14 in other gearing systems as well.

Although the present invention has been illustrated and described with respect to several preferred embodiments thereof, various changes, omissions and additions to the form and detail thereof, may be made therein, without departing from the spirit and scope of the invention.

What is claimed is:

1. Motor-vehicle gear arrangement for a power-assist gearing, comprising:
   a gear;
   a flange arrangement including at least one flange, wherein the gear is located adjacent to the flange so as to rotate about a common axis, a metallic hub is inserted into an axial opening of the flange in a rotationally fixed manner for the purpose of introducing a spindle, the flange is fabricated out of plastic, where the flange includes a lateral surface, a plurality of ribs formed on the lateral surface reinforcing the flange, and a plurality of passages, where the plurality of ribs include radially extending ribs, at least one circumferentially extending rib, and a plurality of circumferentially ring shaped ribs, where the radially extending ribs and the circumferentially extending rib are arranged in a framework, and where each of the circumferentially ring shaped ribs extends around a respective one of the passages; and
   a plurality of pin-shaped connecting elements axially extending through the gear and the passages in the flange connecting the gear to the flange, where each of the pin-shaped connecting elements are in contact with a respective one of the circumferentially ring shaped ribs.

2. Motor-vehicle gear arrangement according to claim 1, wherein the pin-shaped connecting elements connect the flange to an additional flange, and passes through connecting openings disposed within the gear located between the flanges.

3. Motor-vehicle gear arrangement according to claim 2, in which the additional flange is fabricated out of metal.

4. Motor-vehicle gear arrangement according to claim 2, in which the additional flange is formed from a flat disk having depressions on one side, wherein the depressions form corresponding protrusions on the opposite side.

5. Motor-vehicle gear arrangement according to claim 1, wherein the flange and the plurality of ribs are fabricated out of plastic.

6. Motor-vehicle gear arrangement according to claim 1, wherein the plurality of ribs are formed as a single piece with the flange.

7. Motor-vehicle gear arrangement according to claim 1, wherein at least one of the plurality of ribs is circumferentially adjacent to an edge of the flange.

8. Motor-vehicle gear arrangement according to claim 1, wherein the connecting element passes through a flange neck of the flange, and wherein the flange neck passes into or through an opening within the gear in the direction of the gear.

9. Motor-vehicle gear arrangement according to claim 1, wherein a sprue segment for injection molding of the flange is located on a side of the flange on which the plurality of ribs are located.

10. Motor-vehicle gear arrangement according to claim 1, further comprising at least one sprue segment for injection molding of the flange, which sprue segment is located adjacent the plurality of passages for the insertion of the connecting element.

* * * * *